(12) United States Patent
Karalius

(10) Patent No.: US 9,271,609 B2
(45) Date of Patent: Mar. 1, 2016

(54) EXPANDABLE SURFACE MODULAR CUTTING BOARD SYSTEM

(76) Inventor: Brad John Karalius, Brighton, MA (US)

( * ) Notice: Subject to any disclaimer, the term of this patent is extended or adjusted under 35 U.S.C. 154(b) by 1075 days.

(21) Appl. No.: 13/356,469

(22) Filed: Jan. 23, 2012

(65) Prior Publication Data

US 2012/0193858 A1 Aug. 2, 2012

(51) Int. Cl.
*A47J 47/00* (2006.01)
*B23P 11/00* (2006.01)

(52) U.S. Cl.
CPC ............... *A47J 47/005* (2013.01); *A47J 47/00* (2013.01); *Y10T 29/49826* (2015.01)

(58) Field of Classification Search
CPC .............................. A47J 47/005; A47J 47/00
USPC ............. 269/311, 276, 171; 29/428; 452/192
See application file for complete search history.

(56) References Cited

U.S. PATENT DOCUMENTS

| | | | | |
|---|---|---|---|---|
| 1,158,670 A | * | 11/1915 | Forsyth | 269/311 |
| 4,273,318 A | * | 6/1981 | Crowhurst | A47J 47/005 141/331 |
| 5,760,501 A | * | 6/1998 | Grote | H04R 9/00 310/13 |
| 6,460,841 B1 | * | 10/2002 | Durr | A47J 47/005 269/289 R |
| 8,770,562 B1 | * | 7/2014 | Blum | A47J 47/005 269/13 |
| 2004/0099332 A1 | * | 5/2004 | Kieck | A47J 47/12 141/65 |
| 2006/0194456 A1 | * | 8/2006 | Cawley et al. | 439/74 |
| 2009/0014935 A1 | * | 1/2009 | Zeng | 269/302.1 |
| 2010/0289484 A1 | * | 11/2010 | Quinn | G01D 5/145 324/207.2 |
| 2012/0119629 A1 | * | 5/2012 | Nelson | A47B 87/00 312/111 |

OTHER PUBLICATIONS

Buschow, K.H. Jürgen Cahn, Robert W. Flemings, Merton C. Ilschner, Bernhard Kramer, Edward J. Mahajan, Subhash. (2001). Encyclopedia of Materials—Science and Technology, vols. 1-11— Permanent Magnet Assemblies. Elsevier. Online version available at: http://app.knovel.com/hotlink/pdf/id:ktO0B7AHR4/encyclopedia-materials/permanent-magnet-assemb.*

* cited by examiner

*Primary Examiner* — Lee D Wilson
*Assistant Examiner* — Mahdi H Nejad

(57) ABSTRACT

A modular cutting board system comprised of a plurality of cutting boards is disclosed. In this invention, individual cutting boards can be retentively conjoined to other cutting boards of the same or similar make through magnetic holding force, provided by magnets disposed in the non-working surface sides of the cutting boards, to produce a larger working surface. This invention allows for the optional use of magnetic assemblies in place of magnets alone to increase holding force and prevent magnetic interference with steel utensils. Other optional embodiments include rubber gaskets to produce watertight seals and complementary protrusions and recessions to aid in alignment at the conjoining sides. Importantly, this plurality of cutting boards can be easily detached from a conjoined state and into individual cutting boards. This quality of the present invention improves sanitation through easier cleaning and also facilitates storage, compared to large and unwieldy cutting boards.

12 Claims, 6 Drawing Sheets

EXPANDABLE SURFACE MODULAR CUTTING BOARD SYSTEM

CROSS-REFERENCE TO RELATED APPLICATIONS

This application claims benefit of Provisional Patent Application No. 61/462,290, filed on Jan. 31, 2011 by Brad Karalius and Todd Karalius.

STATEMENT REGARDING FEDERALLY SPONSORED RESEARCH OR DEVELOPMENT

Not applicable

REFERENCE TO A SEQUENCE LISTING, A TABLE, OR A COMPUTER PROGRAM LISTING COMPACT DISC APPENDIX

Not applicable

ABSTRACT OF THE DISCLOSURE

A modular cutting board system comprised of a plurality of cutting boards is disclosed. In this invention, individual cutting boards can be retentively conjoined to other cutting boards of the same or similar make through magnetic holding force, provided by magnetic assemblies disposed in the non-working surface sides of the cutting boards, to produce a larger working surface. The use of magnetic assemblies in place of magnets alone to increase holding force and prevent magnetic interference with steel utensils. Other optional embodiments include rubber gaskets to produce watertight seals and complementary protrusions and recessions to aid in alignment at the conjoining sides. Importantly, this plurality of cutting boards can be easily detached from a conjoined state and into individual cutting boards. This quality of the present invention improves sanitation through easier cleaning and also facilitates storage, compared to large and unwieldy cutting boards.

BACKGROUND OF THE INVENTION

1. Field of Invention

This invention relates to kitchenware, specifically to a modular cutting board system. The modular cutting board system is comprised of a plurality of cutting boards where individual cutting boards, all of the same or similar make, can be retentively conjoined together by magnetic force to thereby expand the working surface. The magnetic force is provided by magnetic assemblies and magnetically attractive members disposed in the sides of these cutting boards.

2. Description of Prior Art

Cutting boards are produced in varying sizes that are designed to cater to the size requirements of a specific job. Typically, consumers will purchase various sizes of cutting boards for their kitchens to cover the wide range of tasks performed. Large cutting boards are often needed, but are difficult to clean in small sinks and store in cramped areas. In food industry settings, very large cutting boards are needed and cannot be washed in a sink or dish washer due to their excessively large sizes, thereby compromising sanitation. The present invention seeks to the aforementioned issues by disposing magnetic assemblies in the sides of cutting boards, thereby allowing two or more cutting boards to be conjoined into a single larger working surface through magnetic assembly-to-magnetic assembly or magnetic assembly-to-steel communication. This feature allows these separate cutting boards to be conjoined using magnetic force. Subsequently, the boards can be detached with ease through the application of physical force in the direction perpendicular to the magnetic communication. This quality of the present invention allows the user to assemble an appropriately-sized working surface to cater to the job at hand. This invention also improves sanitation because large assembled working surfaces can be broken down and cleaned in sinks or dishwashers, as opposed to very large cutting boards that cannot fit in sinks or dishwashers. Additionally, this invention facilitates storage, compared to large and unwieldy cutting boards.

U.S. Pat. No. 6,460,841, issued to Bruce A. Durr, describes cutting boards that may be attached to one another using a rigid connection formed by interlocking keyed tongues and grooves, and includes attachable handles. Additionally, U.S. Pat. No. 4,756,519, issued to Curt L. Lilja, allows for two or more cutting boards to be conjoined through mutually-opposing, vertically-extending recesses and projections, and includes the option of a knife guide attachment. U.S. Pat. No. 6,715,748, issued to Ted Thompson and Mike Neshat, also allows for additional cutting boards to be attached, but does so through structural hinge pins on a non-wooden board, with focus on using the invention for outdoor use. The present invention, however, offers an improvement over the described prior art in that magnetic forces are used as the fastening mechanism instead of unaesthetic tongues, grooves, recesses, projections, or pins. The present invention is also potentially not as susceptible to wear and tear at the conjoining interfaces as the described prior art due to its simplified geometry at the conjoining interfaces.

Magnets have been used in earlier cutting board patents, but their function is entirely different from the administered use intended in the present invention. U.S. Pat. No. 7,125,011, issued to Kevin W. McLaughlin, uses magnet bases attached onto a polymer backing that allows for the cutting boards to be stored on refrigerators. Alternatively, U.S. Patent 20100019430, issued to Ralph J. Ferone, uses magnets to attach a cutting board to a base unit with sufficient spacing between the cutting board and base unit so that a food collection tray may be positioned beneath the cutting board, but does not mention the use of magnets to secure cutting boards directly to one another. Additionally, U.S. Patent 20090014935, issued to Lingdong Zeng, uses magnets for attaching food type-specific cutting board panels atop a base unit. Also, U.S. Patent 20090283952, issued to Jenna Sellers, uses magnets to facilitate holding cutting board panels together in a stacked orientation.

U.S. Pat. No. 4,273,318, issued to Brian H Crowhurst describes a food preparation appliance where a food chopping board is attached by magnetic means to a food tray. Extending from this concept using what Bruce A. Durr teaches in U.S. Pat. No. 6,460,841, someone having ordinary skill in the art could modify Crowhurst's teachings to incorporate Durr's teachings to produce a modular cutting board system that uses magnets in the conjoining mechanism. Importantly, it would take an additional, crucial step to produce what the present invention teaches: to use magnetic assemblies as the conjoining mechanism. This further product feature not only allows for a series of cutting boards to be magnetically conjoined to each other, but effectively replaces larger magnets that would have otherwise been necessary to ensures that the holding force will be sufficiently strong for the task at hand and, in contrast to these larger magnets, minimizes magnetic communication with utensils such as steel knives over the work surface, and finally protects brittle magnets during the conjoining action.

OBJECTS OF THE INVENTION

It is an object of the invention to provide a cutting board system that uses magnetic attraction from magnetic assemblies as the mechanism for conjoining cutting boards to produce a single larger working surface. Magnetic assemblies will focus the magnetic fields on the exposed magnet surfaces so that greater holding strength may be achieved. This feature will also ensure that steel utensils are substantially uninfluenced by the magnets during their operation on the cutting board working surfaces.

Another object of the invention is to allow for the cutting boards to be detached from one another by light-to-moderate physical force so that they may be cleaned and stored with greater ease than a large cutting board.

Another object of the invention is to provide the option of elastomer gaskets attached to one or both sides of the cutting boards to be conjoined, resulting in a potentially watertight seal at the conjoining interface.

Another object of the invention is to provide complementary protrusions and recessions on opposing sides of cutting boards that are to be conjoined so that these cutting boards may be aligned horizontally and vertically when conjoined.

BRIEF SUMMARY OF THE INVENTION

The present invention is a modular cutting board system comprised of a plurality of similar cutting boards that can be conjoined through magnetic force from magnetic assemblies. The magnetic assemblies will be positioned within the non-working surface skies of the cutting boards, on at least one dimension, with their magnetic poles facing outwards from these sides. This invention will allow a person to choose the number of retentive-conjoining-capable cutting boards required for the size of the task at hand. In practice, where one cutting board can accomplish a task requiring a small work area, such as, slicing cheese, attaching an additional cutting board or multiple additional cutting boards would enable the preparation of a large serving of food items. Furthermore, this plurality of conjoined cutting boards can be easily detached into individual cutting boards. This quality of the present invention results in easier cleaning of these cutting boards and consequently improved sanitation, as well as easier storage, compared to large and unwieldy cutting boards.

Although many options for magnetic materials exist, magnetic assemblies are used in the present invention for a variety of benefits. Magnetic assemblies, for example a cylindrical magnet contained within a steel cup, commonly referred to as a pot magnet, concentrate magnetic fields on the magnetic assembly surfaces This results in a pull force that is vastly stronger than that of the magnet alone. This feature is crucial because without the use of magnetic assemblies, substantially larger magnets would need to be used, but such larger magnets may not be cost effective, may not fit in the small space allotted for the cutting board conjoining mechanism, and, due to their more dispersed magnetic fields, will dangerously interact with ferromagnetic knives on the cutting board cutting surface. In contrast, magnetic assemblies can reduce the magnetic field strength in the directions towards the working surfaces of the cutting boards. This characteristic can result in a negligible amount of magnetic communication with steel knives that may be used on the cutting board working surfaces. Furthermore, neodymium magnets are preferred in this invention for their superior strength.

Elastomer or plastic gaskets may also but not necessarily be attached to either or both conjoining surfaces of the cutting boards to provide a watertight, or near watertight, seal at this interface. The attachment of these gaskets may be permanent or removable so that they may be removed to be cleaned separately or replaced.

The cutting board sides housing the magnetic assemblies or magnetic assemblies and magnetically attractive members may also but not necessarily feature complementary protrusions and recessions. These complementary protrusions and recessions can act as alignment guides when conjoining the cutting boards together and also hold them together in proper alignment once conjoined.

DETAILED DESCRIPTION OF THE INVENTION

Each cutting board, made out of a food grade material, including wood, wood composite, bamboo, paper composite, rubber, plastic, acrylic, glass, stone or metal. It is preferred that the cutting board material is a structurally stable material, such as edge grain wood panels, bamboo, bamboo plywood, wood composite, paper composite, rubber, plastic, acrylic, glass, stone, or metal because the mechanism for conjoining the cutting boards is dependent upon each cutting board maintaining its original geometry. Each cutting board will also be rectangular or square in shape, with one or more magnetic assemblies disposed in either the non-working surface lengthwise, widthwise, or all sides of the cutting board. The magnetic assemblies will be set at standard distances along the sides of each cutting board so that one cutting board's magnetic assemblies will be aligned with an adjacent cutting board's magnetically attractive members to form a retentive connection between these cutting boards. This connection thereby expands the total working surface. In this arrangement, cutting boards can be connected to each other in either the "x"or "z"dimensions, according to the perspective of a person facing towards a work station.

The magnetically attractive members mentioned above may be oppositely magnetized magnetic assemblies or opposing steel faces. The magnetic assemblies may be positioned approximately flush with the sides in which they are embedded, including being recessed a very small distance from these sides to ensure that the conjoining sides make flush contact before the magnetic assemblies do. Additionally, the magnetic assemblies on a given side of one cutting board may instead be positioned protruding outward from in the side in which they are embedded. The oppositely magnetized magnetic assemblies or opposing steel faces on another cutting board would then be recessed to the same distance as the described protruding magnetic assemblies, or vice versa, to aid in cutting board alignment when conjoining is performed. Alternatively, a given side of a cutting board that contains magnetic assemblies positioned approximately flush to the sides in which they are embedded may instead contain one or more structural protrusions. These protrusions would interact with complementary recesses in the side of another cutting board that contains oppositely magnetized magnetic assemblies or opposing steel faces, also seated approximately flush to the sides in which they are embedded. These features would again aid in cutting board alignment when conjoining is performed because the protrusions and complementary recessions would act as guides to properly align the cutting boards.

Figure 1:
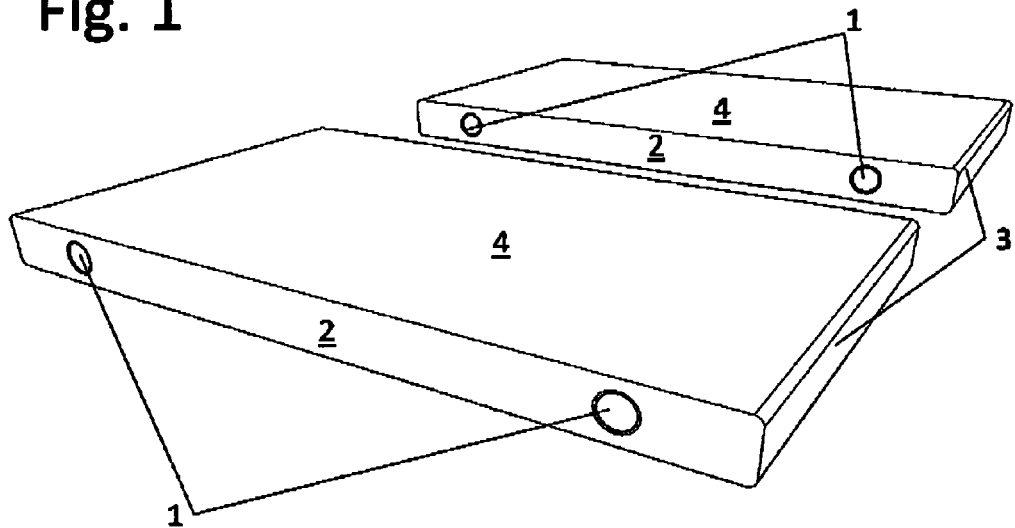
FIG. 1 is an isometric view of two cutting boards, designed in accordance with the claims of the present invention, where complementary pot magnetic assemblies, per their magnetic pole orientations, are positioned along only the dimensionally longer sides of the cutting boards.

FIG. 1 shows an isometric view of two cutting boards that are designed in accordance with the claims and general vision of the present invention. Here, one set of magnetic assemblies with like-poles (e.g. pot magnetic assemblies with north poles as their outer steel ring and south poles as their magnet faces) facing outward (1) is positioned in one side (2) of each cutting board. The complementary pair of magnetic assemblies pot magnetic assemblies with south poles as their outer steel ring and north poles as their magnet faces in this scenario) is not visible in this figure. The non-magnetic assembly containing sides (3) of each cutting board are unimportant towards the functionality of the present invention. The top faces, or bottom faces, of the cutting boards (4) will serve as the working surfaces for where cutting or food preparation is performed. Importantly, this depiction is Only one visioning of the claims of the resent invention and does not represent the full scope of the claims listed herein.

The mechanism by which these cutting boards described in FIG. 1 may be conjoined offers several benefits over conjoining mechanisms utilized by the prior art. The lack of slots, hives, or other non-magnetic structural locking mechanisms; the cutting boards'sides angled 90 degrees from the working surface faces; and the strength of the magnetic fields projected from the cutting boards'magnetic assemblies will create a near seamless union at the interface between the cutting boards of the present invention. The cutting boards of the present invention also have less potential for wear and tear due to the simple rectangular geometry of these cutting boards. Additionally, there is an aesthetic value to the magnetic conjoining mechanism of the present invention over the prior art because pins, hinges, grooves, cutaway slot, or puzzle-like protrusions are not used.

Figure 2:
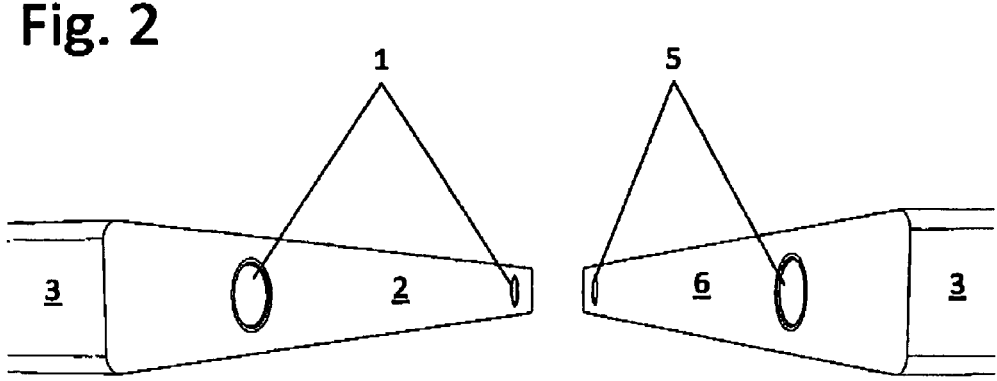
FIG. 2 is a side view of two cutting boards, designed in accordance with the claims of the present invention, where complementary pot magnetic assemblies, per their magnetic pole orientations, are positioned along only the dimensionally longer sides of the cutting boards.

FIG. 2 shows an enlarged view of how the two cutting boards of FIG. 1 are positioned just prior to conjoining. Here, the side (2) of the cutting board shown on the left is embedded with the north pole-outer-steel-ring-facing-outward pot magnetic assemblies (1) flush with that side. The south pole-outer-facing-outward magnetic assemblies are embedded flush in the other side of this cutting board and are not shown in this figure. The second cutting board of the same make is shown on the right and the depicted cutting board side (6) is embedded with south-pole-outer-steel-ring-facing outward magnetic assemblies (5). As such, each cutting board will have the capacity to conjoin with any other cutting board of the same or similar make, contingent upon the placement of magnetic assemblies or magnetic assemblies and opposing steel faces along the cutting boards'sides. The depicted slight recessing of magnets in these cutting boards will allow for a flush fit between the cutting boards when conjoined. Importantly, this depiction is only one visioning of the claim of the present invention, and does not represent the full scope of the claims listed herein.

Figure 3:
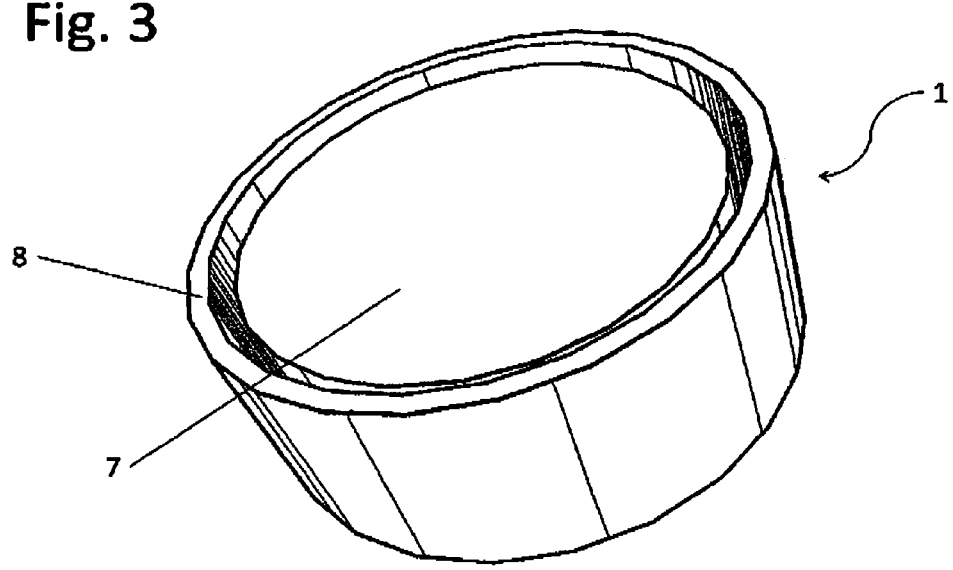
FIG. 3 is an isometric view of a pot magnetic assembly, which is one type of magnetic assembly that provides the holding force necessary for conjoining cutting boards described in the present invention.

FIG. 3 shows a close-up representation of a pot magnetic assembly (1) to provide clarity as to how this given magnetic assembly operates. The magnet (7) here is oriented with its south pole facing outward. The steel cup (8), which is magnetized by the magnet such that the north pole faces outward, protrudes slightly beyond the magnet. This magnetic assembly achieves a stronger holding force and an overall more concentrated magnetic field than its magnet alone and therefore effectively replaces a larger magnet that would have approximately equal holding force but a more dispersed magnetic field.

Figure 4:
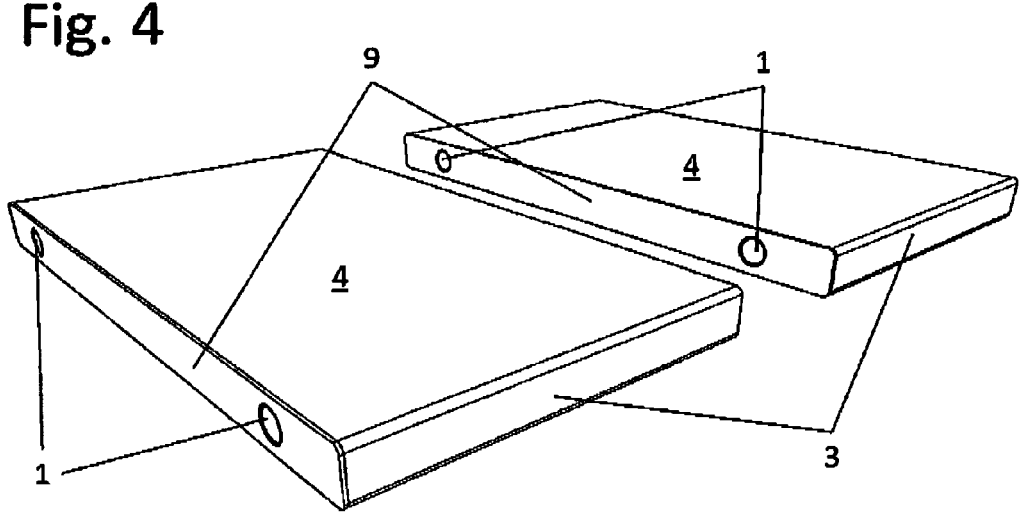
FIG. 4 is an isometric view of two cutting boards, designed in accordance with the claims of the present invention, where complementary pot magnetic assemblies, per their magnetic pole orientations, are positioned along only the dimensionally longer sides of the cutting boards and gaskets are attached to one of these longer sides of each cutting board.

FIG. 4 shows an isometric view of two cutting boards, designed in accordance with the claims and general vision of the present invention, where gaskets (9) are attached to one of the longer sides of each of the cutting boards. The complementary pairs of magnetic assemblies (1 and 5; 5 not shown) are recessed to a very small degree within the cutting board sides in which they are embedded. This recessing creates a distance gap between the complementary pairs of magnetic assemblies when the cutting boards are conjoined. A potentially watertight seal will be achieved when the cutting boards are conjoined because the complementary pairs of magnetic assemblies will attract each other and pull the cutting boards together, closing the distance gap and compressing the elastomer gasket between the coupled cutting boards. Importantly, this depiction is only one visioning of the claims of the present invention and does not represent the full scope of the claims listed herein.

Figure 5:
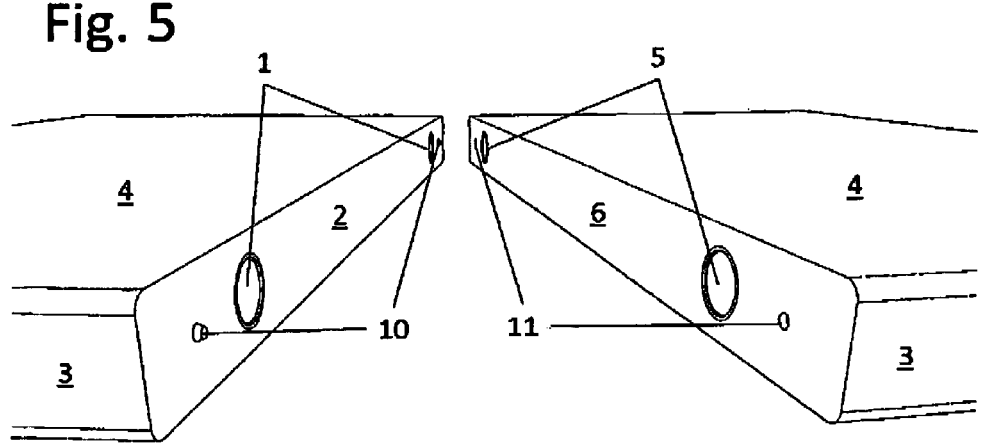
FIG. 5 is a side view of two cutting boards, designed in accordance with the claims of the present invention, where in the left cutting board two protrusions are featured along the pot magnetic assemblies-containing side of the cutting board. These protrusions aid in the alignment of this cutting board with a second cutting board, shown on the right, possessing both complementary recessions and complementary pot magnetic assemblies when the cutting boards are conjoined.
Figure 6:
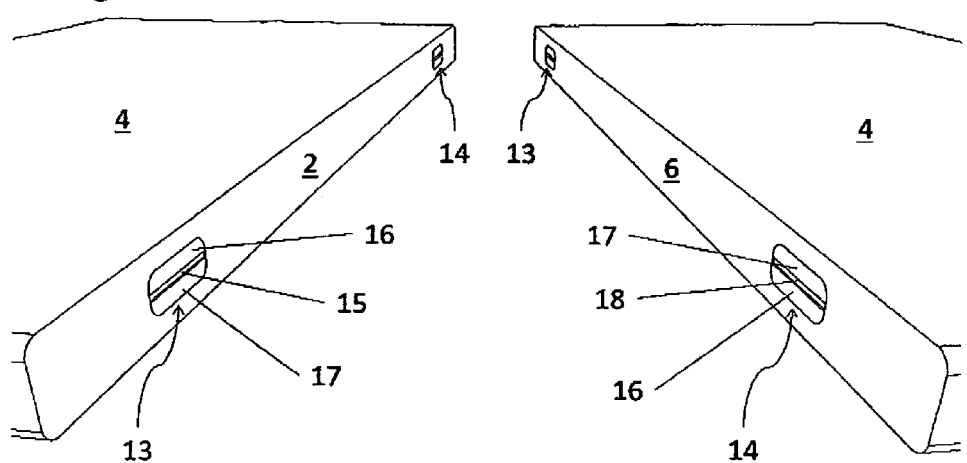
FIG. 6 is a side view of a two cutting boards, designed in accordance with the claims of the present invention, where complementary sandwich magnetic assemblies, per their magnetic pole orientations, are positioned along only the dimensionally longer sides of the cutting boards.

FIG. 5 shows an enlarged view of two cutting boards and their sides that may be conjoined. The first cutting board, shown on the left, features additional protrusions (10) from the side (2) that contains the north-pole-outer-steel-ring-facing-outward magnetic assemblies (1). The south-pole-outer-steel-ring-facing-outward magnetic assemblies are embedded in the other side of this cutting board and are not shown in this figure; this side also features complementary recessions to these depicted protrusions. The second cutting board of the same make, shown on the right, is instead shown with the cutting board side (6) that is embedded with south-pole-outer-steel-ring-facing-outward magnetic assemblies (5). This side features additional recessions (11) that are complementary in their geometry to the protrusions (10). These complementary protrusions and recessions are shown as tapered cylinders. This tapering allows for an initial margin of error when bringing the cutting boards together but results in tight alignment once the cutting boards are conjoined. These complementary protrusions and recessions also aid in holding proper alignment of the conjoined cutting boards. Alternatively, complementary concave and convex hemispheres, ridges and troughs, or similar structures may also be used to aid in such alignment. Importantly, this depiction is only one visioning of the claims of the present invention, and does not represent the full scope of the claims listed herein.

FIG. 6 shows an enlarged view of two cutting boards and their sides that may be conjoined, where sandwich magnetic assemblies, instead of pot magnetic assemblies shown in FIG. 1, are used as the conjoining mechanism. Here, the first cutting board, shown on the left, shows two sandwich magnetic assemblies disposed flush with one side (2). The near sandwich magnetic assembly (13) is oriented such that the bar magnet (15) magnetizes the top steel plate (16) to project the north pole outwards from its face and the bottom steel plate (17) to project the south pole outwards from its face. The far sandwich magnetic assembly (14) uses this same construction, except that it is inverted such that the top steel plate projects the south pole outwards from its face (17) and the bottom steel plate projects the north pole outwards from its face (16). The second cutting board, shown on the right, also, shows these two sandwich magnetic assemblies disposed flush in one side (6), but in reverse order where the near sandwich magnetic assembly (14) has its steel plates magnetized south-over-north due to the inversion of the bar magnet (18), and the far sandwich magnetic assembly (13) is magnetized north-over-south. The positioning of these sandwich magnetic assemblies in this side (6) of the cutting board shown on the right is therefore magnetically complementary to the depicted side (2) of the cutting board shown on the left and thus these cutting boards are capable of retentively conjoining together. In fact, the side (2) and its disposed sandwich magnetic assemblies (13,14) shown on the left is the same exact make as the side (6) with its disposed sandwich magnetic assemblies (14,13) shown on the right and only appears different because it is rotated 180 degrees on the axis that runs parallel with this side. The opposite sides of each of these cutting boards are also of the same make but are not in view in this figure. As such, both cutting boards shown are of the same exact make and only differ in their placement in space. A benefit of this make is that one cutting board can be conjoined to another cutting board lengthwise along their sandwich magnetic assembly-containing sides, regardless of which side (2,6) is chosen and which working surface face (4) is up or down for each cutting board, as these sides are always magnetically complementary to one another. Importantly, this depiction is only one visioning of the claims of the present invention and does not represent the full scope of the claims listed herein.

I claim:

1. A method for conjoining a plurality of cutting boards for culinary purposes at non-working surface sides, comprising:
   a. providing a first cutting board having a non-metallic and having at least one non-working surface side in which one or more magnetic assemblies, characterized by a magnet fastened to ferromagnetic material that redirects said magnet's flux to yield a more concentrated magnetic field and thereby more holding force compared to said magnet alone, are disposed and oriented with their exposed magnet faces facing perpendicular to and away from the sides in which they are disposed,
   b. providing at least one additional cutting board having a non-metallic material and having at least one substantially similarly dimensioned non-working surface side in which one or more magnetically attractive members selected from a group consisting of an iron object, a steel object, or an oppositely magnetized magnetic assembly, are disposed,
   whereby a human can create a single larger working surface having an area equal to the sum of the individual working surface areas of said plurality of cutting boards through the retentive conjoining of said plurality of cutting boards using the action of said magnetic assemblies that provide sufficiently strong holding force, comparable to that of larger magnets alone, to maintain retentive connection of said cutting boards under typical food preparation use and steel utensils operated in the proximity above the conjoined edges of said plurality of cutting boards shall be substantially uninfluenced by the magnetic fields produced from said magnetic assemblies due to the quality of magnetic assemblies to concentrate magnetic fields on their surfaces,
   compared to said larger magnets alone that risk dangerous interaction with said steel utensils due to their more dispersed magnetic fields, wherein said each magnetically attractive means comprising magnets having both north and south poles being combined together forming said each structure and being detachable and attachable with a second said magnetically attractive means comprising a second structure having an inverse polarity being oriented in a direction in which each said magnetic structure thereby forms a holding force.

2. The method of claim 1, further including gaskets made of material selected from a group consisting of rubber, silicone, neoprene, nitrile, or elastic polymer mounted on at least one of each of the non-working surface sides of said cutting boards that are to be conjoined to non-working surface sides of other said cutting boards,
   whereby a potentially watertight seal may be achieved at this gasketed interface when said cutting boards are retentively conjoined.

3. The method of claim 1, further including at least one protrusion from at least one of said non-working surface sides of said first cutting board in which one or more said magnetic assemblies are disposed and at least one recession, complementary to said protrusion, in at least one of said non-working surface sides of said additional cutting board in which one or more magnetically attractive members are disposed, whereby said protrusion and said recession aid in the horizontal and vertical alignment of said cutting boards upon conjoining.

4. The method of claim 2, further including at least one protrusion from at least one of said non-working surface sides of said first cutting board in which one or more said magnetic assemblies are disposed and at least one recession, complementary to said protrusion, in at least one of said non-working surface sides of said additional cutting board in which one or more magnetically attractive members are disposed, whereby said protrusion and said recession aid in the horizontal and vertical alignment of said cutting boards upon conjoining.

5. A plurality of cutting boards for culinary purposes, comprising:
   a. a first cutting board having a non-metallic material and having at least one non-working surface side in which one or more magnetic assemblies, characterized by a magnet fastened to ferromagnetic material that redirects said magnet's flux to yield a more concentrated magnetic field and thereby more holding force compared to said magnet alone, are disposed and oriented with their exposed magnet faces facing perpendicular to and away from the sides in which they are disposed,
   b. at least one additional cutting board having a non-metallic material and having a non-metallic material and having at least one substantially similarly dimensioned non-working surface side,
   c. magnetically attractive means disposed in said side of said additional cutting board for conjoining said additional cutting board to said first cutting board, whereby a human can create a single larger working surface having an area equal to the sum of the individual working surface areas of said plurality of cutting boards through the retentive conjoining of said plurality of cutting boards using the action of said magnetic assemblies that provide sufficiently strong holding force, comparable to that of larger magnets alone, to maintain retentive connection of said cutting boards under typical food preparation use and steel utensils operated in the proximity above the conjoined edges of said plurality of cutting boards shall be substantially uninfluenced by the magnetic fields produced from said magnetic assemblies due to the quality of magnetic assemblies to concentrate magnetic fields on their surfaces, compared to said larger magnets alone that risk dangerous interaction with said steel utensils due to their more dispersed magnetic fields, wherein said each magnetically attractive means comprising magnets having both north and south poles being combined together forming said each structure and being detachable and attachable with a second said magnetically attractive means comprising a second structure having an inverse polarity being oriented in a direction in which each said magnetic structure thereby forms a holding force.

6. The plurality of cutting boards of claim 5, further including gaskets made of material selected from a group consisting of rubber, silicone, neoprene, nitrile, or elastic polymer mounted on at least one of each of the non-working surface sides of said cutting boards that are to be conjoined to non-working surface sides of other said cutting boards, whereby a potentially watertight seal may be achieved at this gasketed interface when said cutting boards are retentively conjoined.

7. The plurality of cutting boards of claim 5, further including at least one protrusion from at least one of said non-working surface sides of said first cutting board in which one or more said magnetic assemblies are disposed and at least one recession, complementary to said protrusion, in at least one of said non-working surface sides of said additional cutting board in which one or more magnetically attractive members are disposed, whereby said protrusion and said recession aid in the horizontal and vertical alignment of said cutting boards upon conjoining.

8. The plurality of cutting boards of claim 6, further including at least one protrusion from at least one of said non-working surface sides of said first cutting board in which one or more said magnetic assemblies are disposed and at least one recession, complementary to said protrusion, in at least one of said non-working surface sides of said additional cutting board in which one or more magnetically attractive members are disposed, whereby said protrusion and said recession aid in the horizontal and vertical alignment of said cutting boards upon conjoining.

9. A plurality of cutting boards for culinary purposes, comprising:

a. a first cutting board having a non-metallic material and having at least one non-working surface side in which one or more magnetic assemblies, characterized by a magnet fastened to ferromagnetic material that redirects said magnet's flux to yield a more concentrated magnetic field and thereby more holding force compared to said magnet alone, are disposed, b. at least one additional cutting board having a non-metallic material and having at least one substantially similarly dimensioned non-working surface side in which one or more magnetically attractive members selected from a group consisting of an iron object, a steel object, or an oppositely magnetized magnetic assembly are disposed, whereby a human can create a single larger working surface having an area equal to the sum of the individual working surface areas of said plurality of cutting boards through the retentive conjoining of said plurality of cutting boards using the action of said magnetic assemblies that provide sufficiently strong holding force, comparable to that of larger magnets alone, to maintain retentive connection of said cutting boards under typical food preparation use and steel utensils operated in the proximity above the conjoined edges of said plurality of cutting boards shall be substantially uninfluenced by the magnetic fields produced from said magnetic assemblies due to the quality of magnetic assemblies to concentrate magnetic fields on their surfaces, compared to said larger magnets alone that risk dangerous interaction with said steel utensils due to their more dispersed magnetic fields, wherein said each magnetically attractive means comprising magnets having both north and south poles being combined together forming said each structure and being detachable and attachable with a second said magnetically attractive means comprising a second structure having an inverse polarity being oriented in a direction in which each said magnetic structure thereby forms a holding force.

10. The plurality of cutting boards of claim 9, further including gaskets made of material selected from a group consisting of rubber, silicone, neoprene, nitrile, or elastic polymer mounted on at least one of each of the non-working surface sides of said cutting boards that are to be conjoined to non-working surface sides of other said cutting boards, whereby a potentially watertight seal may be achieved at this gasketed interface when said cutting boards are retentively conjoined.

11. The plurality of cutting boards of claim 9, further including at least one protrusion from at least one of said non-working surface sides of said first cutting board in which one or more said magnetic assemblies are disposed and at least one recession, complementary to said protrusion, in at least one of said non-working surface sides of said additional cutting board in which one or more magnetically attractive members are disposed, whereby said protrusion and said recession aid in the horizontal and vertical alignment of said cutting boards upon conjoining.

12. The plurality of cutting boards of claim 10, further including at least one protrusion from at least one of said non-working surface sides of said first cutting board in which one or more said magnetic assemblies are disposed and at least one recession, complementary to said protrusion, in at least one of said non-working surface sides of said additional cutting board in which one or more magnetically attractive members are disposed, whereby said protrusion and said recession aid in the horizontal and vertical alignment of said cutting boards upon conjoining.

\* \* \* \* \*